United States Patent [19]
Casale et al.

[11] Patent Number: 6,023,146
[45] Date of Patent: Feb. 8, 2000

[54] BATTERY SYSTEM ELECTRICAL CONNECTION APPARATUS AND METHOD

[75] Inventors: Thomas J. Casale, Aurora; Larry K. W. Ching, Littleton, both of Colo.

[73] Assignee: Optima Batteries, Inc., Aurora, Colo.

[21] Appl. No.: 09/045,208

[22] Filed: Mar. 20, 1998

[51] Int. Cl.[7] .............................. H02J 7/00; H01M 2/24
[52] U.S. Cl. .......................... 320/112; 429/99; 429/159; 29/623.1
[58] Field of Search ..................... 320/112, 107; 429/99, 96, 123, 158, 159, 178; 29/623.1, 623.2

[56] References Cited

U.S. PATENT DOCUMENTS

| | | |
|---|---|---|
| 1,779,946 | 10/1930 | Nelson . |
| 1,903,448 | 4/1933 | Furtney . |
| 3,309,235 | 3/1967 | Teeple, Sr. . |
| 3,989,544 | 11/1976 | Santo . |
| 4,064,725 | 12/1977 | Hug et al. . |
| 4,212,179 | 7/1980 | Juergens . |
| 4,346,151 | 8/1982 | Uba et al. . |
| 4,383,011 | 5/1983 | McClelland et al. . |
| 4,421,832 | 12/1983 | Uba . |
| 4,435,486 | 3/1984 | Pomaro et al. . |
| 4,606,982 | 8/1986 | Nelson et al. . |
| 4,637,966 | 1/1987 | Uba et al. . |
| 4,648,177 | 3/1987 | Uba et al. . |
| 4,756,978 | 7/1988 | Nitcher et al. . |
| 4,780,379 | 10/1988 | Puester . |
| 5,091,273 | 2/1992 | Hug et al. . |
| 5,104,752 | 4/1992 | Baughman et al. . |
| 5,120,620 | 6/1992 | Nelson et al. . |
| 5,283,137 | 2/1994 | Ching . |

OTHER PUBLICATIONS

08/853,377 filed May 8, 1997, of John B. Olson for Improved Battery Paste Compositions and Electrochemical Cells for use Therewith.
08/888,905 filed Jul. 7, 1997, of Thomas J. Casale, et al., for Battery Internal Temperature Measurement Apparatus and Method.
08/888,478 filed Jul. 7, 1997, of Thomas J. Casale, et al., for Battery Venting System and Method.

*Primary Examiner*—Peter S. Wong
*Assistant Examiner*—K. Shin
*Attorney, Agent, or Firm*—Klaas, Law, O'Meara & Malkin, P.C.

[57] ABSTRACT

Disclosed is a battery system in which a battery is provided with a pair of quick connect electrical contact mechanisms. A battery tray, for receiving the battery, is also provided with a pair of quick connect electrical contact mechanisms which are adapted to connect and establish electrical continuity with the battery quick connect mechanisms. The battery pin assemblies may be molded into the battery cover and may be welded to the existing positives and negative battery posts. In this manner, the provision of the pins requires no additional penetrations of the battery container, thus reducing the potential for leakage of electrolyte from the container. The pins may be nested within indentations provided in the container. In this manner, the provision of the pins adds only minimally to the overall dimensions of the battery, thus resulting in a compact design. In the case of a spirally wound cell battery, the pins may be nested within the indentation formed between two of the battery cells and may be located either on the ends or the sides of the battery. Alternatively, in a spirally wound cell battery, the pins may be located in openings formed between four cells in the interior of the battery.

21 Claims, 12 Drawing Sheets

BATTERY SYSTEM ELECTRICAL CONNECTION APPARATUS AND METHOD

BACKGROUND OF THE INVENTION

Electric batteries are commonly used to store and deliver electrical energy. One type of electric battery, known as a lead-acid battery, is commonly employed in vehicles (e.g. cars, trucks, boats, aircraft, and the like) for ignition, lighting, and other related purposes. These applications are typically known as "SLI" or "starting-lighting-ignition" functions. Lead-acid batteries are also increasingly being used in electric vehicle applications in which a battery pack containing multiple batteries provides electric current to power the vehicle.

A conventional lead-acid battery typically includes a number of electrochemical cells housed within a single battery housing. The electrochemical cells within a lead-acid battery are typically electrically connected in a series relationship such that the voltage supplied by the overall battery will be equal to the sum of individual voltages supplied by each electrochemical cell. In a typical application, for example, six two-volt electrochemical cells may be electrically connected within the housing of a single battery such that the battery supplies electrical energy at a voltage of twelve volts.

Each electrochemical cell in a lead-acid battery typically includes electrically-conductive positive and negative current collectors typically manufactured in the form of foraminous (porous) metallic grids. The individual current collectors may be planar (flat) in configuration or spirally-wound as discussed further below. Lead-acid electrochemical cells further include a supply of electrolyte solution therein. This electrolyte solution may be used in different ways within a given electrochemical cell. For example, the electrolyte may be present in liquid form wherein the electrolyte is not contained or absorbed in any structures. This type of battery is normally characterized as a "flooded battery" or "free electrolyte battery." Flooded batteries are generally constructed from planar (flat) positive and negative plates which are arranged in a parallel configuration having the electrolyte solution therebetween.

In contrast, another type of electrochemical cell which is conventionally known as a "retained electrolyte battery" involves a system in which the electrolyte solution is absorbed and retained within a separator element positioned between the plates. Retained electrolyte batteries may involve plate structures which are planar (flat) in configuration and arranged in a parallel orientation having the electrolyte-containing separator member positioned therebetween. Representative electrochemical cells of this type are discussed in the following U.S. Pat. No. 4,421,832 of Uba for ELECTROCHEMICAL CELL and U.S. Pat. No. 5,120,620 of Nelson et al. for BINARY LEAD-TIN ALLOY SUBSTRATE FOR LEAD-ACID ELECTROCHEMICAL CELLS, both of which are hereby specifically incorporated by reference for all that is disclosed therein.

In addition, retained electrolyte batteries may also be produced in a spirally wound configuration in which the positive and negative plates are wound together with the electrolyte-containing separator element positioned therebetween. Examples of this particular battery type are presented in the following U.S. Pat. No. 4,064,725 of Hug et al for APPARATUS FOR MAKING SPIRALLY WOUND ELECTROCHEMICAL CELLS; U.S. Pat. No. 4,212,179 of Juergens for DRIVEN MANDREL AND METHOD; U.S. Pat. No. 4,346,151 of Uba et al. for MULTICELL SEALED RECHARGEABLE BATTERY; U.S. Pat. No. 4,383,011 of McClelland et al. for MULTICELL RECOMBINING LEAD-ACID BATTERY; U.S. Pat. No. 4,606,982 of Nelson et al. for SEALED LEAD-ACID CELL AND METHOD; U.S. Pat. No. 4,637,966 of Uba et al for SEALED LEAD-ACID CELL; U.S. Pat. No. 4,648,177 of Uba et al. for METHOD FOR PRODUCING A SEALED LEAD-ACID CELL; U.S. Pat. No. 4,780,379 of Puester for MULTICELL RECOMBINANT LEAD-ACID BATTERY WITH VIBRATION RESISTANT INTERCELL CONNECTOR; and U.S. Pat. No. 5,091,273 of Hug et al. for METHOD OF APPLYING A TAIL WRAP TO A WOUND ELECTROCHEMICAL CELL AND CELL PRODUCED BY THE METHOD and in U.S. patent application Ser. No. 08/853,377, filed May 8, 1997 of John B. Olson for IMPROVED BATTERY PASTE COMPOSITIONS AND ELECTROCHEMICAL CELLS FOR USE THEREWITH, which are all hereby specifically incorporated by reference for all that is disclosed therein. Spirally wound batteries offer a high degree of efficiency and capacity in a minimal amount of physical space.

Lead-acid batteries may also be produced in two additional types, namely, (1) sealed; and (2) unsealed. In an unsealed battery, the interior of the battery housing is open to the ambient (outside) environment such that fluid communication exists between the interior and the exterior of the battery housing. Thus, in an unsealed battery, hydrogen and oxygen gases, which are produced by all lead-acid batteries during charging, are allowed to escape from the battery housing into the surrounding atmosphere.

Sealed batteries are also known as "recombinant" or "starved electrolyte" batteries. In this type of battery, the battery housing is substantially sealed to prevent the egress of gases therefrom during normal operating situations. In a sealed lead-acid battery, hydrogen and oxygen generated by the battery are retained within the battery housing and allowed to recombine into water molecules. A representative sealed (recombinant) battery system is discussed, for example, in U.S. Pat. No. 4,383,011, previously referenced.

Lead-acid batteries are usually connected to their loads via cables. In the case of a typical automotive SLI battery, for example, the automobile would be provided with a positive and a negative battery cable. The positive cable is then attached to a positive terminal on the battery and the negative cable to a negative terminal on the battery. The connection between a cable and a battery terminal is generally accomplished via a clamping mechanism on the cable which grips a terminal post on the battery. An example of such a clamping mechanism and battery post is illustrated in U.S. Pat. No. 1,779,946 of Nelson for BATTERY CONDITION INDICATOR, which is hereby incorporated by reference for all that is disclosed therein. Alternatively, the connection between a cable and a battery terminal may be accomplished via a threaded member attached to the cable and a threaded receptacle attached to the battery terminal. An example of such a threaded receptacle is disclosed in U.S. Pat. No. 5,283,137 of Ching for COVER ASSEMBLY FOR RECHARGEABLE BATTERY, which is hereby incorporated by reference for all that is disclosed therein.

When removing or installing a battery, the use of such connection mechanisms has proven to be cumbersome and time consuming and further requires the use of tools. In addition, these conventional connection mechanisms often provide less than optimum electrical conductivity, and thus often reduce the potential efficiency of the battery system.

The problems discussed above are amplified in the case of an electric vehicle application where a multiple battery pack is typically used. In such an application, it often becomes necessary to replace a battery in the battery pack. The use of conventional clamping or threaded connectors, as described above, results in time consuming battery replacement and in decreased battery system efficiency.

Various prior attempts have been made to solve the problems discussed above. These attempts have resulted in several "quick connect" designs which allow a battery to be installed without the need for cables. These prior designs, however, suffer from various disadvantages. Most of these designs, for example, require that additional penetrations be made to the battery container. Such additional penetrations are undesirable since each penetration of a battery container represents a potential point of leakage of electrolyte from the container. Many of these prior designs also increase the size of the physical envelope of the battery and/or provide unreliable or inefficient electrical continuity.

Accordingly, it would be desirable to provide a battery system which overcomes the problems described above and, thus, allows for rapid, reliable and efficient battery connections.

SUMMARY OF THE INVENTION

The present invention is directed to a battery system in which a battery is provided with a pair of quick connect electrical contact mechanisms. A battery tray, for receiving the battery, is also provided with a pair of quick connect electrical contact mechanisms which are adapted to connect and establish electrical continuity with the battery quick connect mechanisms.

The battery quick connect mechanisms may take the form of elongated pins while the battery tray quick connect mechanisms may take the form of sockets. In this manner, the action of lowering a battery into the battery tray will cause the pins to slidingly engage within the sockets and, thus, establish electrical connection between the battery and the tray.

The battery pin assemblies may be molded into the battery cover and may be welded to the existing positive and negative battery posts. In this manner, the provision of the pins requires no additional penetrations of the battery container, thus reducing the potential for leakage of electrolyte from the container.

The pins may be nested within indentations provided in the container. In this manner, the provision of the pins adds only minimally to the overall dimensions of the battery, thus resulting in a compact design. In the case of a spirally wound cell battery, the pins may be nested within the indentation formed between two of the battery cells and may be located either on the ends or the sides of the battery. Alternatively, in a spirally wound cell battery, the pins may be located in openings formed between four cells in the interior of the battery.

The battery may alternatively be provided with sockets and the battery tray with elongated pins. As a further alternative, and in order to prevent polarity mis-matches, the battery may be provided with both a pin and a socket and the battery tray with a corresponding socket and pin.

DETAILED DESCRIPTION OF THE INVENTION

Figure 1:
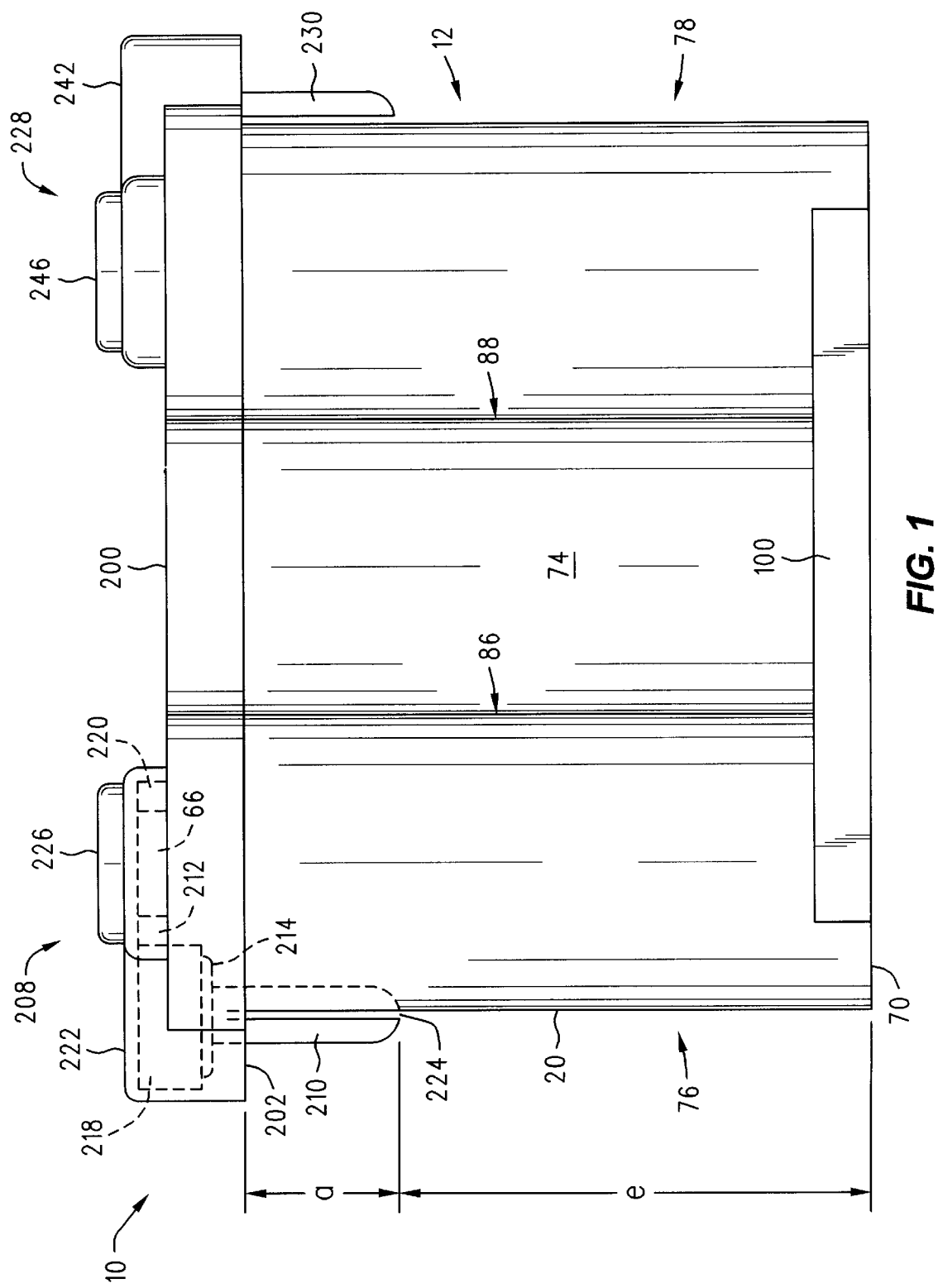
FIG. 1 is a side elevation view of a battery including improved electrical connectors.

FIGS. 1–13, in general, illustrate a battery 10 of the type having at least one elongated electrical connector 210, 230 which is adapted to contact an electrical contact member 313 of a battery receptacle 310 when the bat ery 10 is installed within the battery receptacle 310. The battery 10 includes a battery container 12 including a battery case 20 and a battery cover 200. The battery case 20 has a closed bottom wall 70 and an oppositely disposed open end. The battery cover 200 closes the battery case open end. The battery container 12 defines an enclosed volume and an unenclosed volume, the enclosed volume being substantially enclosed by the battery container 12 and the unenclosed volume being located on the opposite side of the battery container 12 relative to the enclosed volume. The battery further includes a plurality of battery cells 42 located within the enclosed volume. The at least one elongated electrical connector 210, 230 is electrically connected to the plurality of battery cells 42. The at least one elongated electrical connector 210, 230 further includes a first end attached to the battery container 12 and a second terminal end 233 opposite the first end. The second terminal end 233 is located in the unenclosed volume adjacent to but spaced from the battery container 12. The second terminal end 233 extends away from the first end in a direction substantially toward the battery case bottom wall 70. The at least one elongated electrical connector 210, 230 is adapted to slidingly engage with the battery receptacle electrical contact member 313.

FIGS. 1–13 further illustrate, in general, a battery 10 of the type having at least one electrical connector 210, 230 which is adapted to contact an electrical contact member 213 of a battery receptacle 310 when the battery 10 is installed within the battery receptacle 310. The battery 10 includes a battery container 12 defining an enclosed volume and an unenclosed volume, the enclosed volume being substantially enclosed by the battery container 12 and the unenclosed volume being located on the opposite side of the battery container 12 relative to the enclosed volume. The battery container 12 includes at least one indentation 82, 84, 86, 88, 90, 92, 110, 112, 114, 116, 118, 120, 122, 124 therein facing the unenclosed volume and a plurality of battery cells 42 located within the enclosed volume. The at least one electrical connector 210, 230 is electrically connected to the plurality of battery cells 42. The at least one electrical connector 210, 230 further includes a first end attached to the battery container and a second terminal end 233 opposite the first end. The second terminal end 233 is located in the unenclosed volume and at least partially within the at least one indentation 82, 84, 86, 88, 90, 92, 110, 112, 114, 116, 118, 120, 122, 124. The at least one electrical connector 210, 230 is adapted to slidingly engage with the receptacle electrical contact member 313.

Claims 1–13 further illustrate, in general, a method of installing a battery 10 within a battery receptacle 310. The method includes the step of providing a battery 10 having a battery container 12 defining an enclosed volume and an unenclosed volume, the enclosed volume being substantially enclosed by the battery container 12 and the unenclosed volume being located on the opposite side of the battery container 12 relative to the enclosed volume. The battery container 12 includes at least one indentation 82, 84, 86, 88, 90, 92, 110, 112, 119, 116, 118, 120, 122, 124 therein facing the unenclosed volume. The battery further includes a plurality of battery cells 42 located within the enclosed volume and at least one electrical connector 210, 230 electrically connected to the plurality of battery cells 42. The electrical connector 210, 230 further includes a first end attached to the battery container; a second terminal end 233 opposite the first end; the second terminal end 233 being located in the unenclosed volume and at least partially within the at least one indentation 82, 84, 86, 88, 90, 92, 110, 112, 114, 116, 118, 120, 122, 124. The method further includes the steps of providing a battery receptacle 310 comprising at least one receptacle electrical contact member 313; and causing the at least one battery electrical connector 210, 230 to electrically engage with the at least one receptacle electrical contact member 313 by moving the battery 10 into the receptacle 310.

Having thus described the battery system and method in general, the system and method will now be described in further detail.

Figure 2:
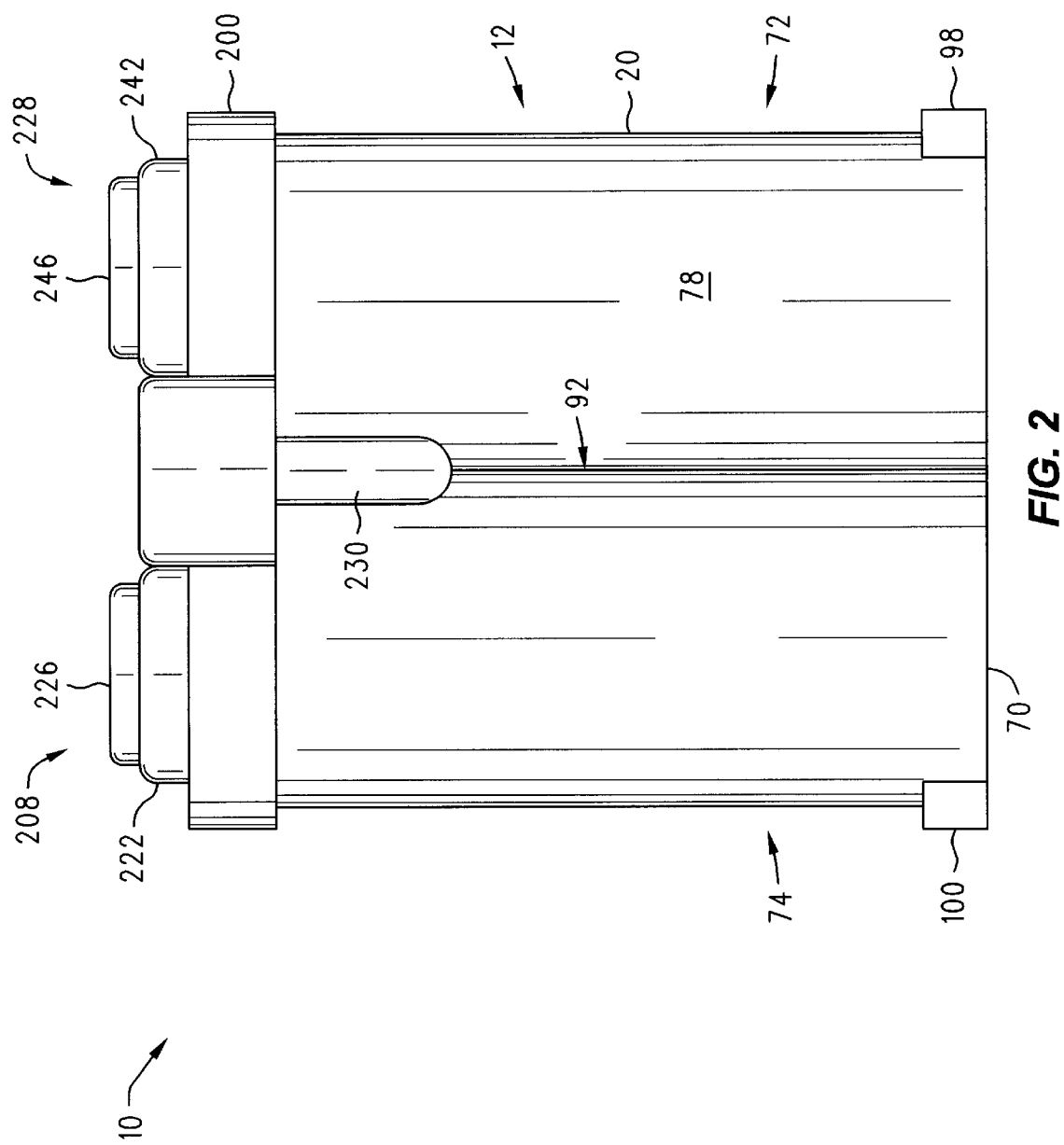
FIG. 2 is an end elevation view of the battery of FIG. 1.

FIGS. 1 and 2 illustrate a lead-acid storage battery 10. The battery 10 generally includes a battery container 12 which may be formed from a battery case 20 and a battery cover 200. The battery 10 is illustrated herein as being ea spirally wound cell type battery. Spirally wound battery cells are described, for example in U.S. Pat. Nos. 4,064,725; 4,212, 179; 4,383,011; 4,606,982; 4,637,966; 4,648,177; 4,780,379 and 5,091,273, previously referenced. Spirally wound battery cells are also described in U.S. patent application Ser. No. 08/853,377, filed May 8, 1997 of John B. Olson for IMPROVED BATTERY PASTE COMPOSITIONS AND ELECTROCHEMICAL CELLS FOR USE THEREWITH; U.S. patent application Ser. No. 08/888,905, filed Jul. 7, 1997 for METHOD AND APPARATUS FOR MEASURING THE INTERNAL TEMPERATURE OF A BATTERY of Thomas J. Casale and Larry K. W. Ching; and U.S. patent application Ser. No. 08/888,478, filed Jul. 7, 1997 of Thomas J. Casale, Larry K. W. Ching, Jose T. Baer and David H. Swan for BATTERY VENTING SYSTEM AND METHOD, which are all hereby specifically incorporated by reference for all that is disclosed therein. It is noted, however, that the battery 10 may, alternatively, be any other type of lead-acid battery.

Figure 3:
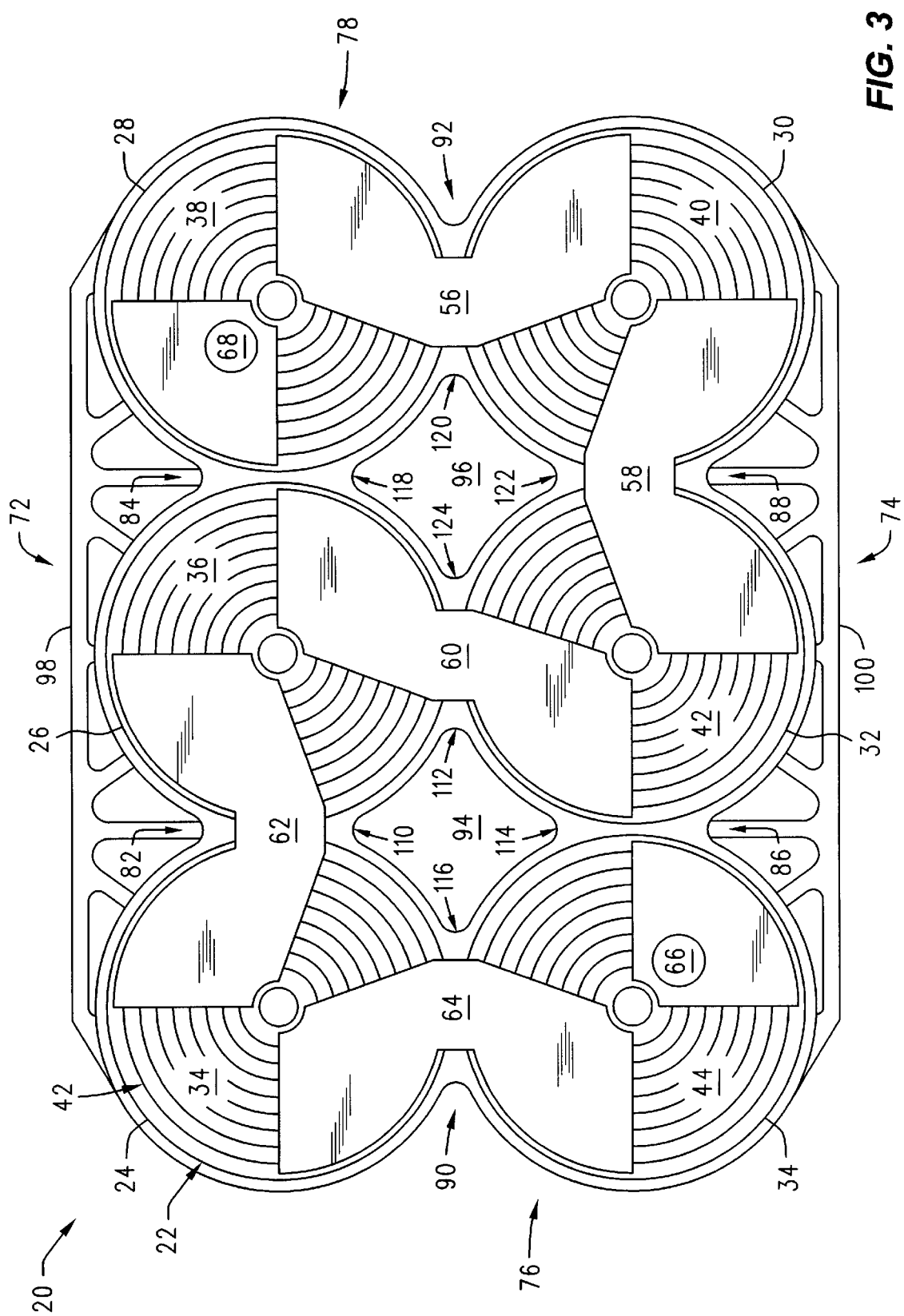
FIG. 3 is a top plan view of the battery of FIG. 1 with its cover removed.

FIG. 3 is a top plan view of the battery case 20 with the battery cover 200 removed for illustration purposes. Referring to FIGS. 1–3, battery case 20 may generally include a bottom wall 70, FIGS. 1 and 2, and a plurality of transversely disposed walls extending upwardly from the bottom wall 70. Specifically, the transversely disposed walls may include first and second sidewalls 72 and 74, respectively, and first and second end walls, 76 and. 78, respectively. The walls 72, 74, 76, 78 may terminate in an upper open end of the battery case 20 as illustrated in FIG. 3.

Referring again to FIG. 3, the case 20 may include a plurality of compartments 22, such as the individual compartments 24, 26, 28, 30, 32 and 34. A plurality of battery cells 42 may be located within the compartments 22. Specifically, the battery cells 34, 36, 38, 40, 42 and 44 may be located within the individual compartments 24, 26, 28, 30, 32 and 34, respectively. Each of the battery cells 42 may be interconnected in a conventional manner, e.g., via connection straps. Specifically, a strap 56 may interconnect the cells 38 and 40; a strap 58 may interconnect the cells 40 and 42; a strap 60 may interconnect the cells 42 and 36; a strap 62 may interconnect the cells 36 and 34; and a strap 64 may interconnect the cells 34 and 44.

A positive terminal post 66 may be attached to the cell 44 in a conventional manner. In a similar manner, a negative terminal post 68 may be attached to the cell 38, also in a conventional manner.

Due to the nature of the spiral cell geometry, the battery case 20 way include a plurality of indentations on its exterior surface. First sidewall 72, for example, may include indentations 82 and 84, FIG. 3. Specifically, indentation 82 may be formed between the compartments 24 and 26 while indentation 84 may be formed between the compartments 26 and 28.

Second sidewall 74 may include indentations 86 and 88, FIGS. 1 and 3. Specifically, indentation 86 may be formed between the compartments 32 and 34 while the indentation 88 may be formed between the compartments 30 and 32.

First end wall 76 may include an indentation 90, FIG. 3, located between the compartments 24 and 34. Second end wall 78 may include an indentation 92, FIGS. 2 and 3, located between the compartments 28 and 30.

In addition to the indentations 82, 84, 86, 88, 90 and 92 described above, the battery case 20 may further include a pair of openings 94 and 96 which extend completely through the housing 20 as illustrated in FIG. 3. The opening 94 may be bounded by the compartments 24, 26, 32 and 34 while the opening 96 may be bounded by the compartments 26, 28, 30 and 32, as shown. The openings 94, 96 may also be bounded by indentations formed between each of the bounding compartments. Opening 94, for example, may be bounded by an indent 110, formed between the compartments 24 and 26, an indent 112, formed between the compartments 26 and 32, an indent 114, formed between the compartments 32 and 34 and an indent 116, formed between the compartments 34 and 24. Opening 96 may be bounded by an indent 118, formed between the compartments 26 and 28, an indent 120, formed between the compartments 28 and 30, an indent 122, formed between the compartments 30 and 32 and an indent 124, formed between the compartments 32 and 26.

Referring to FIGS. 1–3, battery case 20 may further include a pair of bottom flanges 98, 100. Specifically, bottom flange 98 may be attached to the lower portion of the sidewall 72 while bottom flange 100 may be attached to the lower portion of the sidewall 74. The flanges 98, 100 may be provided to facilitate mounting the battery, e.g., into the engine compartment of an automobile.

When the battery case 20 and battery cover 200 are assembled, as illustrated, for example, in FIGS. 1 and 2, the battery cover 200 provides a head space located above the battery case compartments 22 in a conventional manner. This head space interconnects the battery case compartments 22. Thus, as can be appreciated, this head space along with the compartments 22, define a volume which is enclosed by the battery container 12. Conversely, the area outside of the battery container, including the openings 94, 96, represents a volume which is not enclosed by the container 12.

Figure 4:
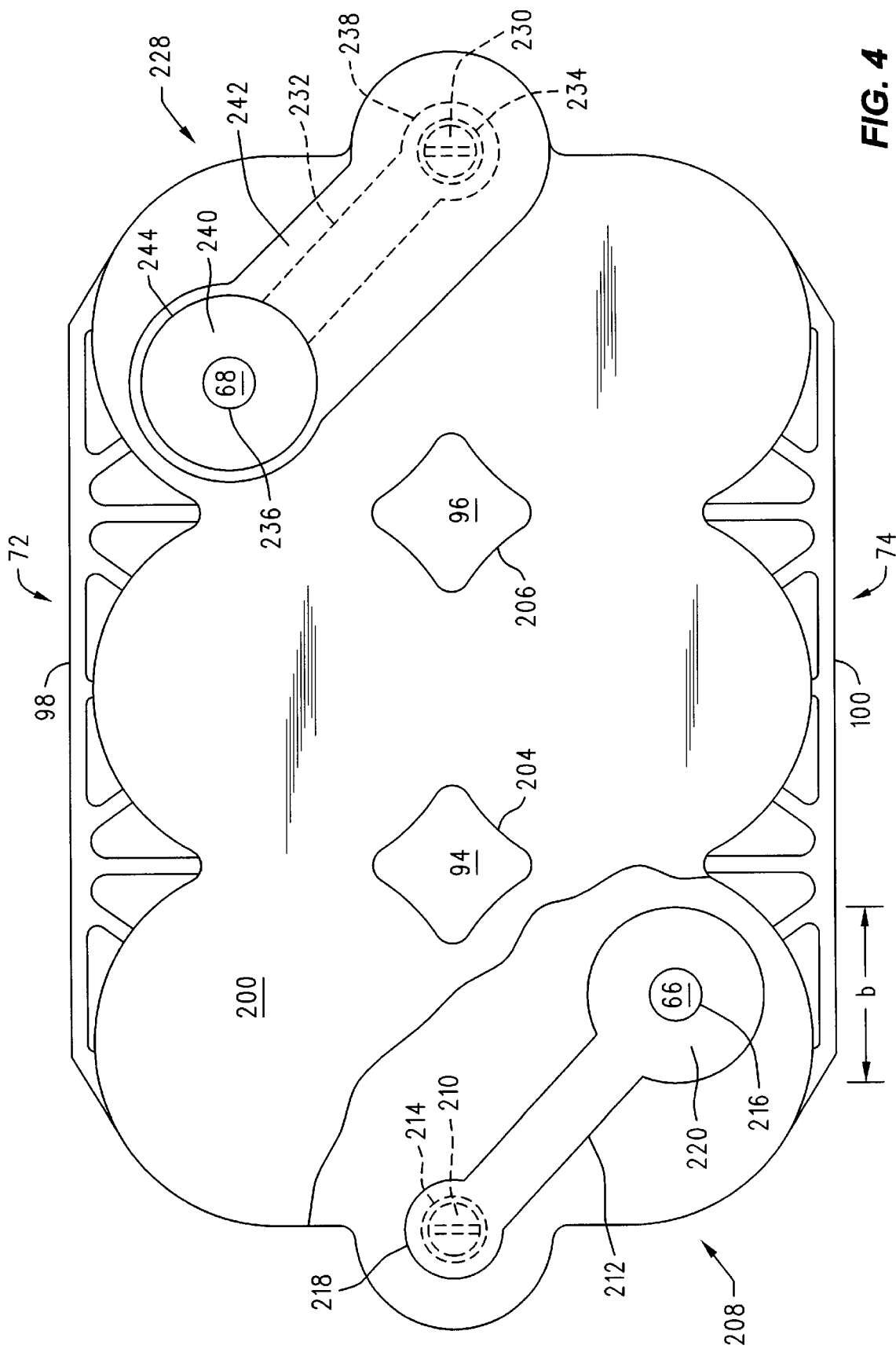
FIG. 4 is a top plan, partial cutaway view of the battery of FIG. 1.

Battery cover 200 may be molded from a plastic material, such as polypropylene in a conventional manner. Referring to FIG. 4, battery cover 200 may include a pair of openings 204, 206 therethrough which align with the battery case openings 94, 96, respectively, FIG. 4, when the cover 200 is installed on the battery case 20. Referring to FIGS. 1 and 2, battery cover 200 may further include a positive connector assembly 208, including a positive electrical connector 210, and a negative connector assembly 228, including a negative electrical connector 230 as shown. Positive and negative connector assemblies 208, 228 may be formed in a substantially identical manner.

Referring again to FIG. 4, positive connector assembly 208 may include a positive a strap 212, the first end 218 of which is attached to the positive electrical connector 210. A flange 214, FIGS. 3 and 4, may be formed at the junction of the connector 210 and the strap 212 for added strength. Strap 212 may include a through-hole 216 located at a second end 220 thereof. Second end 220 may have an outline which is substantially circular, as shown, with a diameter "b" of about 0.88 inches. Through-hole 216 may be formed having a diameter slightly larger than the diameter of the positive terminal post 66.

The strap 212 and the electrical connector 210 of the positive connector assembly 208 may be formed as an integral unit. The strap 212 may, for example, be formed of lead. The electrical connector 210, however, may be formed from a harder metal, such as copper or brass and may, for example, be insert molded into the electrical strap 212 in a conventional manner.

Referring again to FIG. 4, negative connector assembly 228 may include a negative strap 232, the first end 238 of which is attached to the negative electrical connector 230. A flange 234, FIG. 4, may be formed at the junction of the connector 230 and the strap 232 for added strength. Strap 232 may include a through-hole 236 located at a second end 240 thereof. Second end 240 may have an outline which is substantially circular, as shown, with a diameter equal to the diameter "b" of the positive strap second end 220, as previously described. Through-hole 236 may be formed having a diameter slightly larger than the diameter of the negative terminal post 68.

In a similar manner to the positive connector assembly 208, as described above, the strap 232 and the electrical connector 230 of the negative connector assembly 228 may be formed as an integral unit. The strap 232 may, for example, be formed of lead. The electrical connector 230, however, may be formed from a harder metal, such as copper or brass and may, for example, be insert molded into the electrical strap 232 in a conventional manner.

Figure 6:
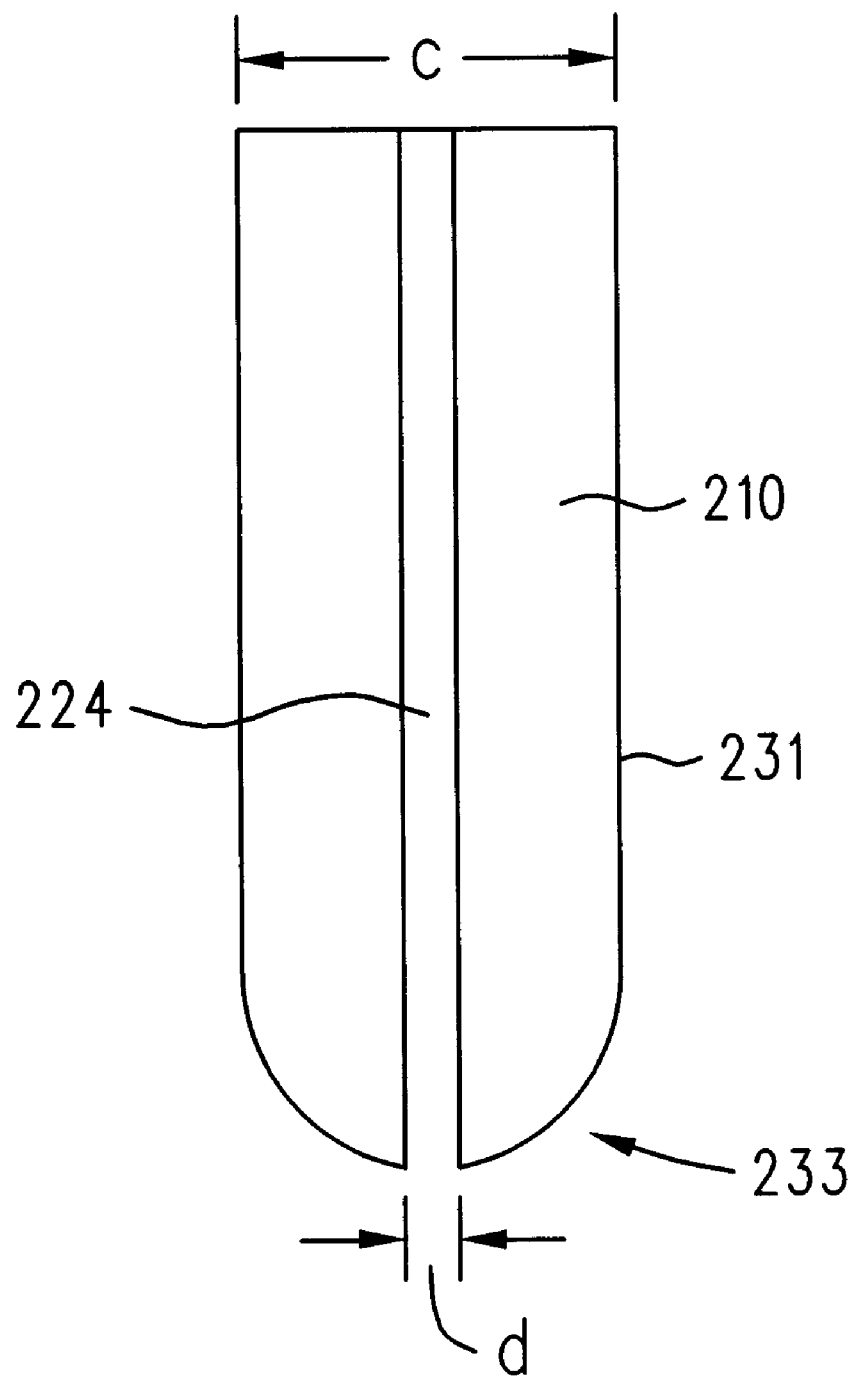
FIG. 6 is an enlarged detail elevation view of an electrical connector of the battery of FIG. 1.

The configuration of the positive and negative electrical connectors 210, 230 is illustrated in greater detail in FIG. 6 with respect to the pin 210. As can be seen, the connector may have an outer diameter "c" of about 0.380 inches and may include a slot 224 having a width "d" of about 0.05 inches. The connector 210 may have an outer surface 231 and may end in a tapered portion 233 as shown.

Both the positive and negative connector assemblies 208, 228 may be molded directly into the battery cover 200 when the cover 200 is formed. Referring to FIGS. 1 and 2, it can be seen, for example, that the strap 212 is partially covered by plastic material 222 which forms part of the cover 200. Referring to FIGS. 1, 2 and 4, it can be seen, for example, that the strap 232 is partially covered by plastic material 242 which forms part of the cover 200. This plastic material 222, 242 is absent, however, in the area immediately above the positive and negative strap end portions 220, 240.

With reference, for example, to the negative connector assembly 228 in FIG. 4, it can be seen that a substantially circular opening 244 is provided in the plastic material 242 directly over the negative strap second end 240 as shown. The opening 244 may have a diameter substantially equal to the diameter "b" of the positive and negative strap second end portions 220, 240, as previously described.

Referring, for example, to FIGS. 1 and 2, a portion of the connectors, 210, 230 may extend for a distance "a" of about 1.0 inch beneath the lower surface 202 of the battery cover 200 as shown, for example, in FIG. 1.

The battery cover 200 may be installed on the open end of the battery case 20 in a conventional manner such that the battery cover 20 is sealed to the battery case 20. When installed in this manner, the positive and negative battery terminal posts 66, 68 will protrude through the holes 216, 236 of the positive and negative straps 212, 232 in a manner as illustrated, for example, in FIG. 4. The straps 212, 232 may then be securely attached to the battery posts 66, 68, for example, by welding. The openings in the plastic material 222, 242, e.g, the opening 244 in FIG. 4, provide access to accomplish this attachment. After attachment, the openings may be sealed with plastic plugs or caps 226, 246, FIGS. 1 and 2. The plugs or caps may be attached to the battery cover 200 within the openings in any conventional manner, such as by spin welding or gluing.

Figure 5:
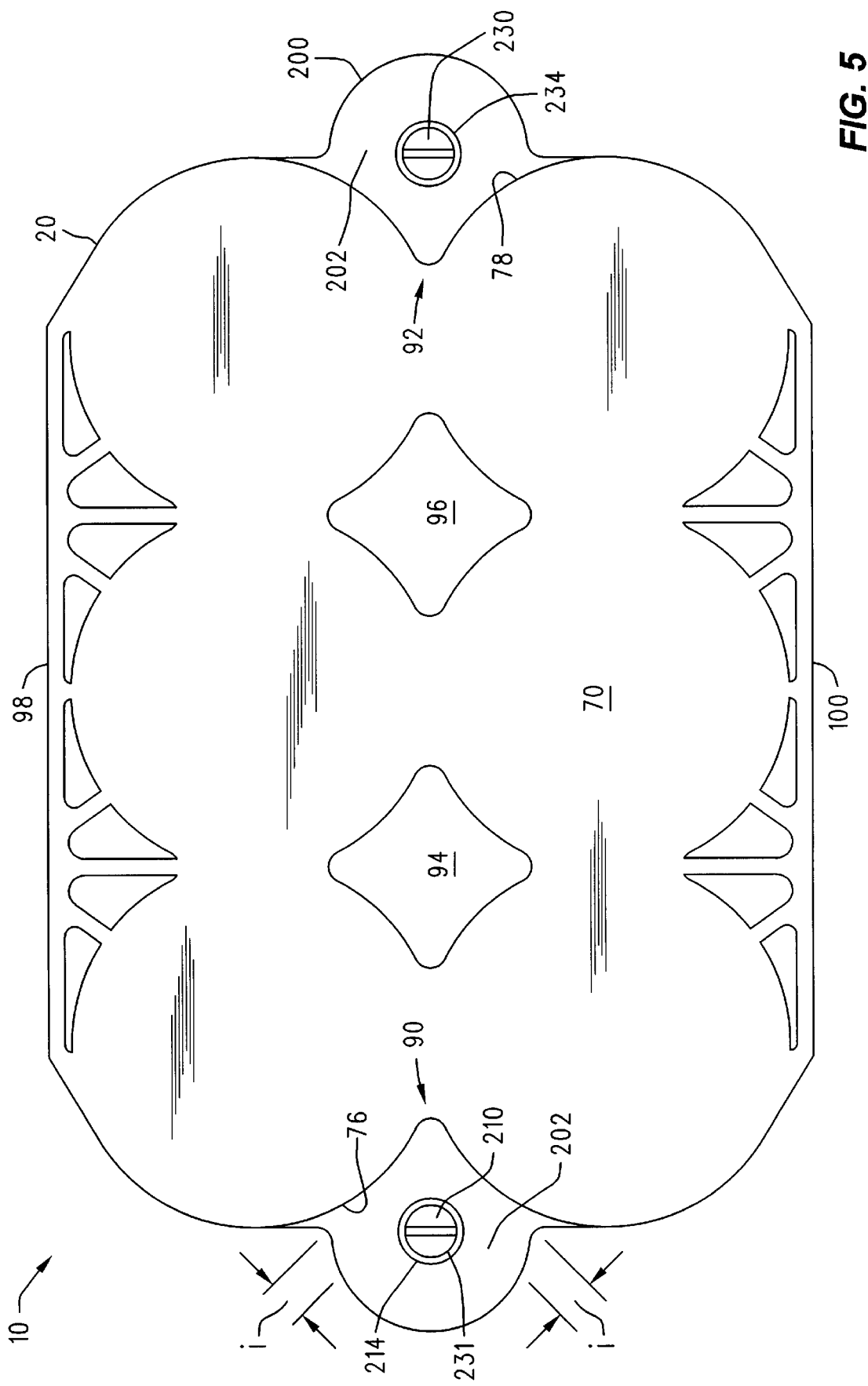
FIG. 5 is a bottom plan view of the battery of FIG. 1.

As can be appreciated, with the battery cover 200 and battery housing 20 assembled as described above, the positive and negative electrical connectors 210, 230 will provide electrical continuity with the positive and negative battery terminal posts 66, 68, respectively. As can further be appreciated, with reference to FIGS. 1–5, the positive electrical connector 210 will be positioned such that it is partially nested within the indent 90 in the first end wall 76 of the battery case 20. In a similar, manner, the negative electrical connector 230 will be positioned such that it is partially nested within the indent 92 in the second end wall 78 of the battery case 20. Referring to FIG. 5, specifically, it can be seen that the outer surface 231 of the pin 210 may be spaced a minimum distance "i" of about 0.10 inches from the first end wall 76 of the battery case 20. As can be appreciated, the nesting arrangement of the electrical connectors 210, 230 within the indentations 90, 92, as described above, contributes to the overall compactness of the battery 10.

Figure 7:
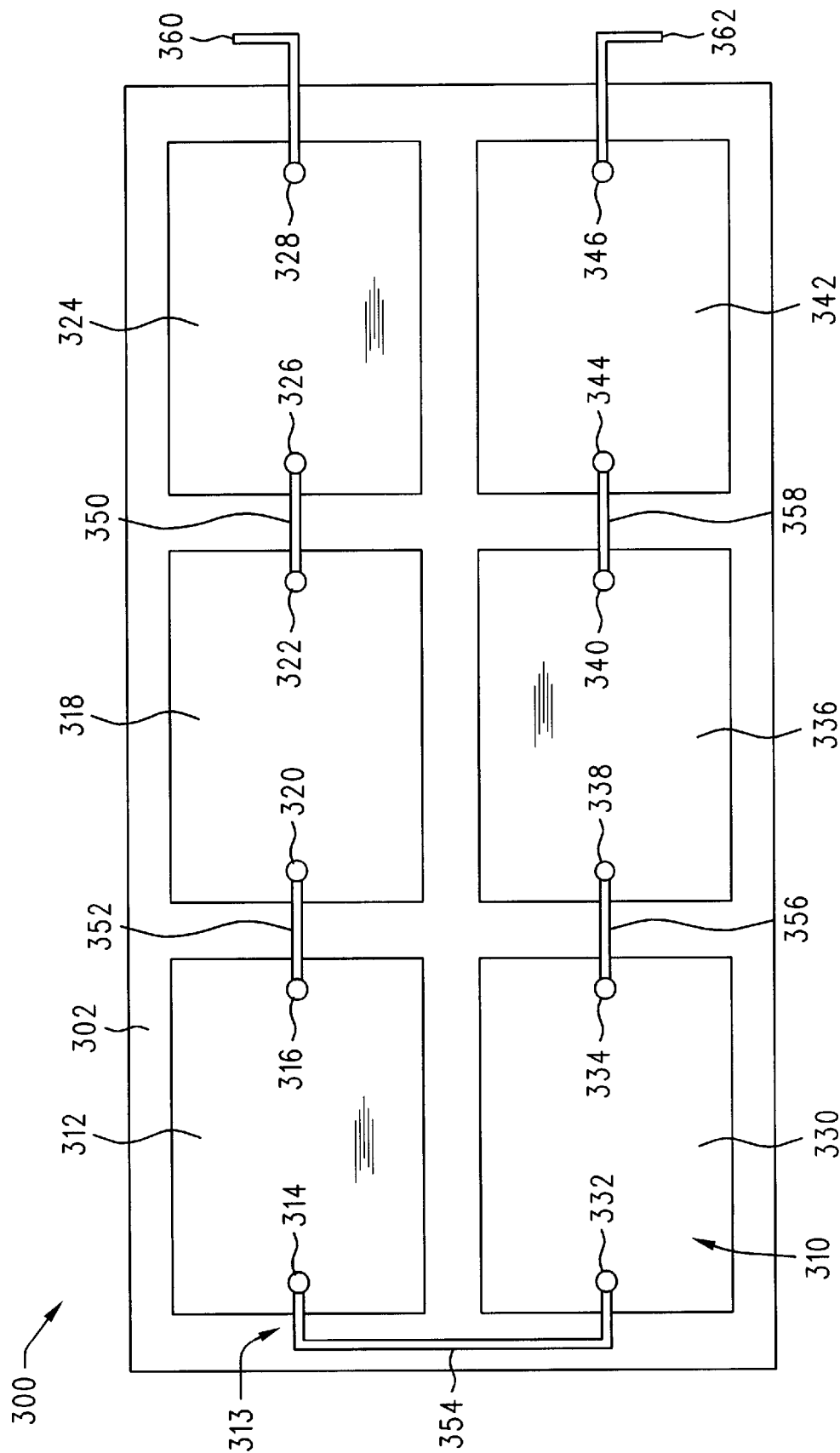
FIG. 7 is a top plan view of a battery receptacle tray used in conjunction with the battery of FIG. 1.

As can further be appreciated, the battery 10 may be electrically connected using the electrical connectors 210, 230 in a quick and convenient manner. FIG. 7 illustrates a receptacle for batteries such as the battery 10 which might, for example, be used in an electric vehicle application. Referring to FIG. 7, a battery pack 300 may include a plurality 310 of battery receptacles, such as the individual receptacles 312, 318, 324, 330, 336 and 342. The receptacles 310 may include a plurality of electrical contact members 313. Specifically, each of the receptacles 310 may include a pair of electrical contact members. More specifically, receptacle 312 may include positive and negative electrical contact members 314, 316; receptacle 318 may include positive and negative electrical contact members 320, 322; receptacle 324 may include positive and negative electrical contact members 326, 328; receptacle 330 may include positive and negative electrical contact members 332, 334, receptacle 336 may include positive and negative electrical contact members 338, 340; and receptacle 342 may include positive and negative electrical contact members 344, 346. The electrical contact members may be located within each receptacle such that they whll align with the battery electrical connectors 210, 230 when a battery is installed within the battery receptacle, as will be described in further detail herein.

Each of the electrical contact members may be interconnected as shown in FIG. 7. Specifically, the electrical contact member 326 may be connected to the electrical contact member 322 via a strap 350; the electrical contact member 320 may be connected to the electrical contact member 316 via a strap 352; the electrical contact member 314 may be connected to the electrical contact member 332 via a strap 354; the electrical contact member 334 may be connected to the electrical contact member 338 via a strap 356; and the electrical contact member 340 may be connected to the electrical contact member 344 via a strap 358. The electrical contact members 328, 346 may be connected to straps 360, 362, respectively in order to facilitate connecting the battery tray 300 to a load, such as the motor of an electric vehicle.

Figure 8:
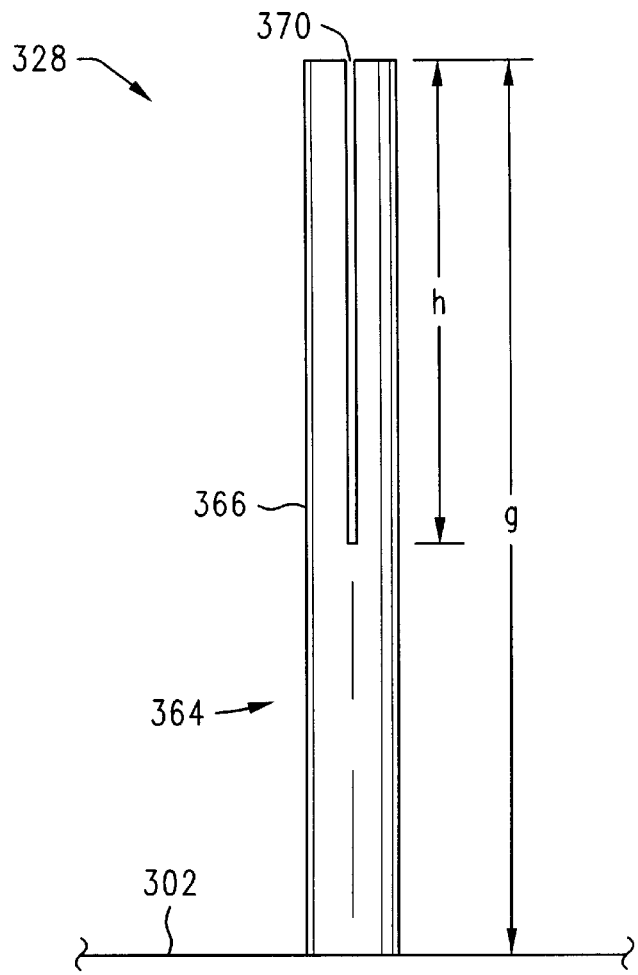
FIG. 8 is an enlarged detail elevation view of an electrical contact member used in conjunction with the battery receptacle tray of FIG. 7.
Figure 9:
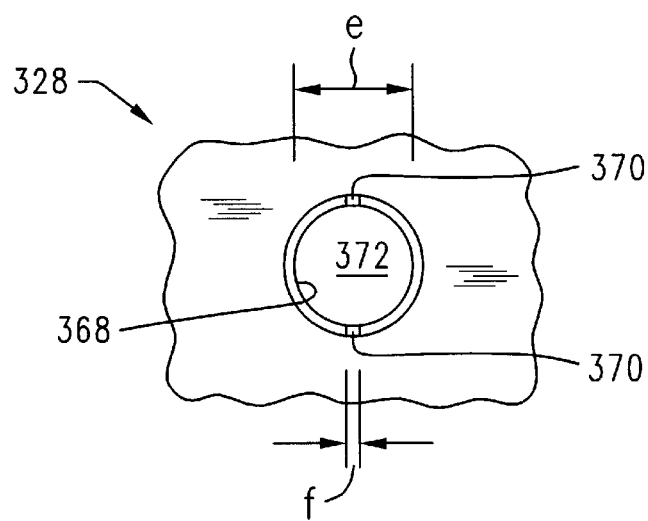
FIG. 9 is a top plan view of the electrical contact member of FIG. 8.

FIGS. 8 and 9 illustrate, in further detail, the electrical contact member 328 of FIG. 7, which may be identical to all of the electrical contact members in the battery tray 300. Referring to FIGS. 8 and 9, the electrical contact member 328 may take the form of a socket which is formed from a generally annular sleeve member 364, as shown. Sleeve member 364 includes an outer surface 366, FIG. 8. A generally circular opening 372 may be formed within the sleeve member and may have a diameter "e", FIG. 9, of about 0.375 inches. The circular opening 372 defines an inner surface 368, FIG. 9. A slot 370 may be formed in the annular sleeve member 364 as shown. The slot 370 may have a width "f" of about 0.05 inches. Referring to FIG. 8, the socket 328 may have a height "g" above the battery tray lower surface 302 chosen to ensure that the electrical connector 230 of the battery 10 will engage within the socket 328 when the battery 10 is inserted into the battery tray receptacle 324. In one example, where the electrical connectors 210, 230 extend to within a distance "e", FIG. 1, of about 1.0 inch from the bottom wall 70 of the battery 100, the height "g" of the socket 328 above the battery tray lower surface 302, FIG. 8, may be chosen to be about 4.8 inches. Referring again to FIG. 8, the slot 370 may extend for a distance "h" of about 1.2 inches, as shown.

Figure 10:
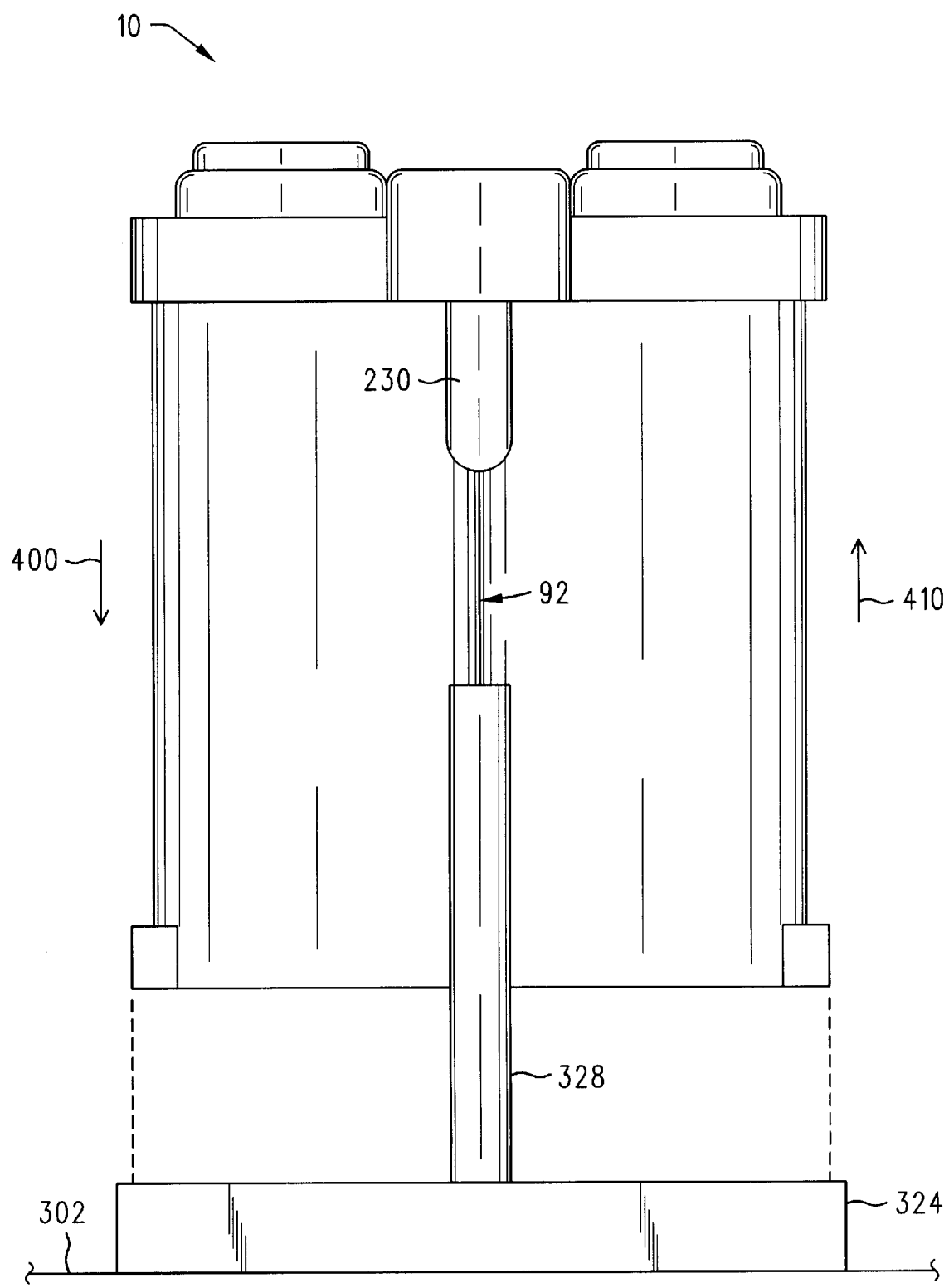
FIG. 10 is an end elevation view illustrating the battery of FIG. 1 partially inserted within the battery receptacle of FIG. 7.

As can be appreciated, the battery 10 and tray 300, allow a battery to easily be installed or removed without the need to connect individual battery cables. To install the battery 10 into the tray 324, FIG. 7, for example, a user merely lowers the battery 10 into the tray 324. FIG. 10 illustrates a condition in which the battery 10 has been partially lowered into the receptacle 324. With reference to FIG. 10, as the battery moves downwardly, in the direction 400, relative to the receptacle 324, the positive and negative battery electrical connectors 210, 230 will enter the sockets 326, 328, respectively, causing reliable electrical contact to be established between the battery 10 and the tray 300.

Specifically, the electrical connectors and sockets may be sized so as to cause an interference fit to occur between the connectors and sockets. As previously described, for example, the electrical connectors may have a diameter "c", FIG. 6, of about 0.380 inches. The opening in the sockets may have a smaller diameter "e", FIG. 9, of about 0.375 inches. When the relatively larger diameter electrical connector enters the relatively smaller diameter socket opening, the connector slot 224, FIG. 6, will compress slightly. In a similar manner, the socket slot 370, FIG. 9, will expand slightly. In this manner, tight, reliable contact may be established between the outer surface 231, FIG. 5, of the connector and the inner surface 368, FIG. 9, of the socket.

The interference fit described above is further advantageous in that it causes the electrical connector and socket slot to be self cleaning. Specifically, the sliding contact between the two members, during both insertion and removal, tends to remove dirt and/or corrosion from the contact surfaces and, thus, enhance electrical conductivity between the members.

Referring again to FIG. 10, to remove the battery 10, the process is merely reversed by moving the battery 10 in the direction 410.

It is noted that the sockets, e.g., the sockets 326, 328, FIG. 7, serve a purpose in addition to providing reliable electrical connection with the battery electrical connectors 210, 230 as described above. Specifically, the sockets may serve to guide a battery 10 into one of the battery tray receptacles 310. Referring to FIGS. 5 and 10, it can be appreciated, for example, that, as, a battery is lowered into the receptacle 324, the sockets 326, 328 will engage within the indents 90, 92, guiding the battery in its downward movement and, thus, facilitate the alignment of the sockets 326, 328 with the electrical connectors 210, 230. Specifically, contact between the socket outer surfaces, e.g., the outer surface 366 of the socket 328, FIG. 8, and the battery case end walls 76, 78 in the area of the indents 90, 92 will prevent misalignment of the battery with respect to the sockets 326, 328. The tapered ends of the electrical connectors, e.g., the tapered end 233 of the connector 210, FIG. 6, further facilitates alignment and insertion of the connectors into the sockets.

The design of the battery 10 provides a compact arrangement due to the nesting of the electrical connectors 210, 230 within the battery case indentations 90, 92. This compact design is highly desirable, particularly in electric vehicle applications where it is often necessary to fit a large number of batteries into a limited space.

As can be appreciated, the design of the battery 10 also allows the use of the external electrical connectors 210, 230 without necessitating any additional penetrations of either the battery case or the battery cover. This is advantageous in that such penetrations represent potential leakage points for the escape of battery electrolyte from the battery case.

It is noted that, although FIG. 7 illustrates a series electrical connection, the tray 300 could readily be configured alternatively in a parallel configuration or in a combination series/parallel configuration depending upon the requirements of the load being connected to the tray 300. It is further noted that, although FIG. 7 illustrates six battery receptacles 310, any desired number could alternatively be used. The tray 300 might, for example, be configured as a single receptacle configuration for use in an automobile in order to house a standard starting, lighting and ignition battery. Such a single receptacle configuration would allow a battery to easily be removed or installed into an automobile without the need to connect battery cables.

It is noted that, for exemplary purposes, the battery 10 has been described herein as having pin-type (i.e., male) electrical connectors and battery tray 300 has been described as having socket type (i.e., female) electrical contact members. It is to be understood that the battery 10 could readily be provided instead with socket type electrical connectors and the battery tray 300 with pin type electrical contact members.

Alternatively, the battery 10 may be provided with both a pin type connector and a socket type connector. Referring to FIG. 1 the positive connector assembly 208 may, for example, be provided with a pin-type connector as shown, while the negative connector assembly 228 may be provided with a socket-type connector. The battery tray 300 may then be provided with corresponding alternating connectors in order to properly connect with the battery 10. Specifically, for example, the electrical contact member 326, FIG. 7, may be provided as a socket type connector as shown, while the electrical contact member 328 may be provided as a pin-type connector. The above arrangement has the added advantage of eliminating the possibility of a polarity mismatch since it prevents a battery from being installed in a reversed configuration.

As a further alternative, the battery 10 may be provided with both electrical connectors 210, 230 as previously described and additionally with standard lug-type connectors. Specifically, referring to FIGS. 1 and 3, standard lug-type battery connectors may be attached in a conventional manner to the posts 66 and 68 and the caps 226, 246, FIGS. 1 and 2, may be eliminated. Such an alternative battery design allows electrical connections to be established either with the electrical connectors 210, 230 or the standard lug-type connectors or with both.

Figure 11:
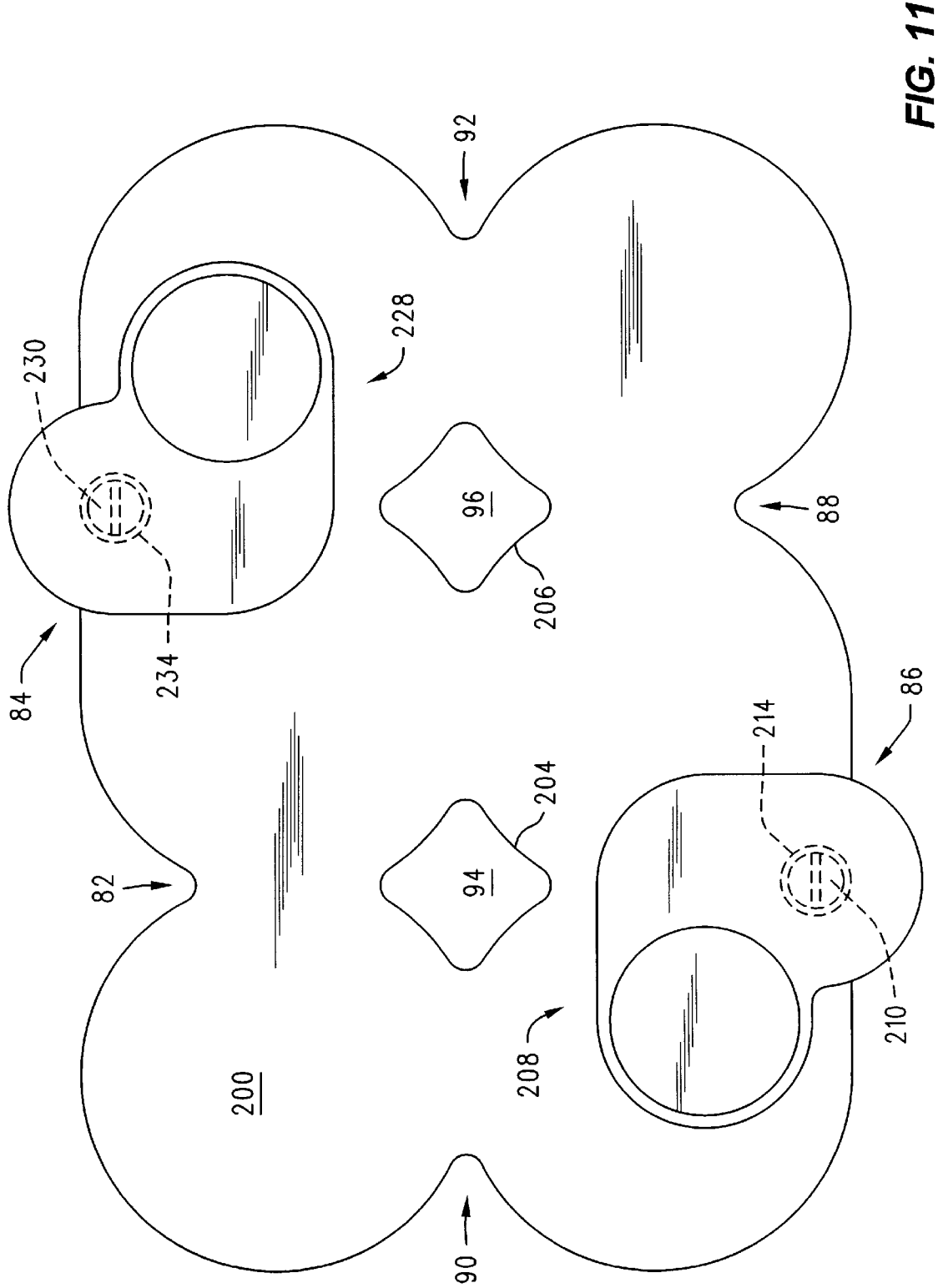
FIG. 11 is top plan view of an alternate embodiment of a battery including improved electrical connectors.
Figure 12:
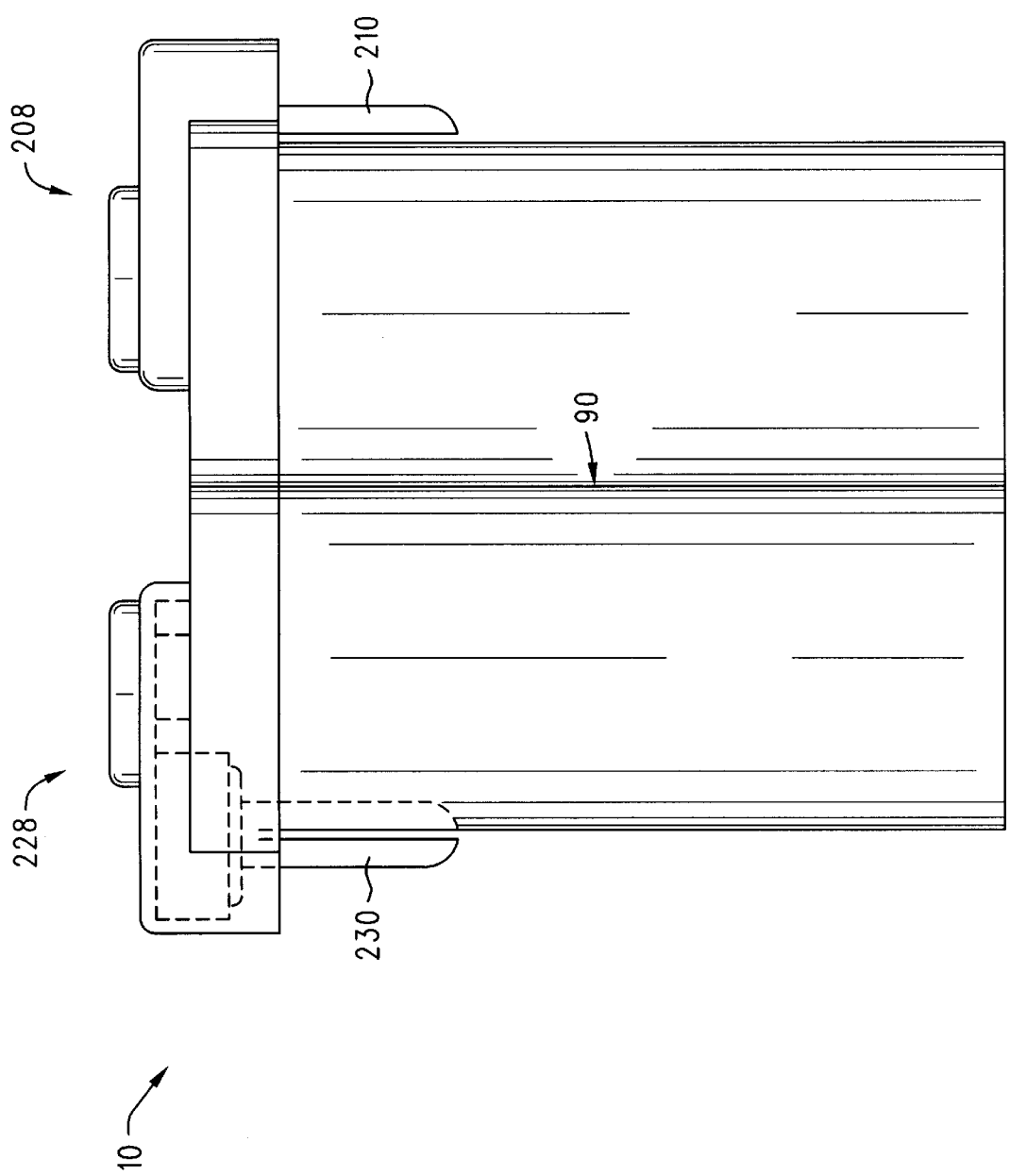
FIG. 12 is an end elevation view of the battery of FIG. 11.

FIGS. 11 and 12 illustrate an alternative embodiment in which the electrical connector 210 is nested within the indentation 86 in the battery case second side wall 74 and the electrical connector 230 is nested within the indentation 84 in the battery case first side wall 72. The flange members 98, 100, illustrated in FIGS. 1–5, may be omitted, as illustrated in FIGS. 11 and 12, in order to provide access for the sockets of the battery tray 300. Alternatively, the flange members 98, 100 may merely be omitted within the indentations 84 and 86, but maintained within the indentations 82 and 88. With the exception of the repositioned electrical connectors 210, 230, and the modification to the flange members 98, 100 described above, the embodiment of FIGS. 10 and 11 may be formed in a substantially identical manner to that described above with respect to FIGS. 1–10.

Figure 13:
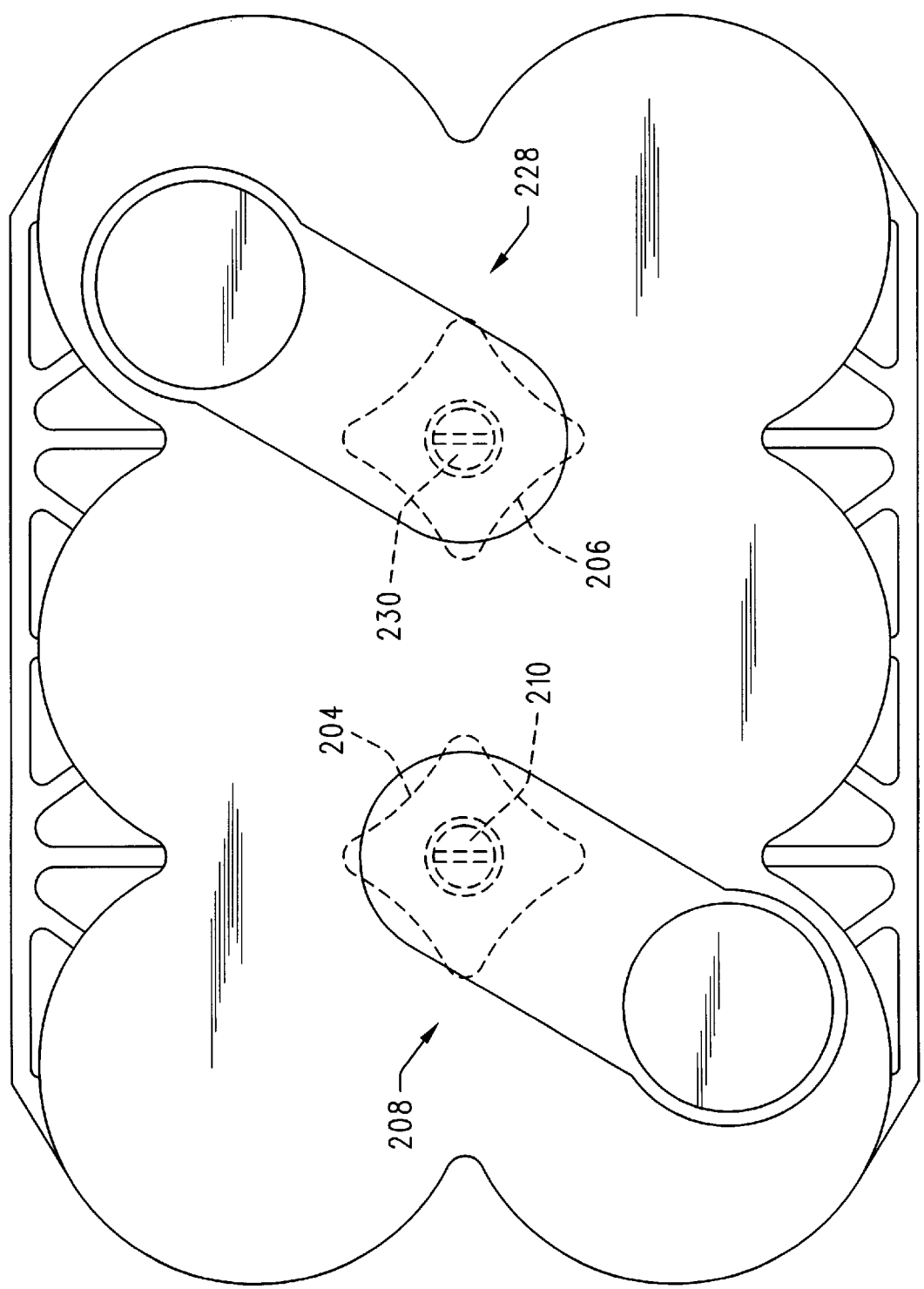
FIG. 13 is top plan view of another alternate embodiment of a battery including improved electrical connectors.

FIG. 13 illustrates an alternative embodiment in which the electrical connector 210 is centrally positioned within the opening 204 in the battery cover 200 and the opening 94, e.g., FIG. 3, in the battery case 20. The electrical connector 230 is centrally positioned within the opening 206 in the battery cover 200 and the opening 96 in the battery case 20. Accordingly, the electrical connector 210 is nested within the battery case indents 110, 112, 114, 116 and the electrical connector 230 is nested within the battery case indents 118, 120, 122, 124, FIG. 3. With the exception of the repositioned electrical connectors 210, 230, the embodiment of FIG. 13 may be formed in a substantially identical manner to that described above with respect to FIGS. 1–10.

In both the embodiment of FIGS. 11 and 12 and the embodiment of FIG. 13, it is to be understood that the location of the electrical contact members within each of the receptacles 310 of the battery tray 300 may be modified to accommodate and align with the re-positioned electrical connectors 210, 230.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A battery of the type having at least one elongated electrical connector which is adapted to contact an electrical contact member of a battery receptacle when said battery is installed within said battery receptacle, said battery comprising:
    a battery container including a battery case and a battery cover;
    said battery case having a closed bottom wall and an oppositely disposed open end;
    said battery cover closing said battery case open end;
    said battery container defining an enclosed volume and an unenclosed volume, said enclosed volume being substantially enclosed by said battery container and said unenclosed volume being located on the opposite side of said battery container relative to said enclosed volume;
    a plurality of battery cells located within said enclosed volume;
    wherein said at least one elongated electrical connector is electrically connected to said plurality of battery cells, and wherein said at least one elongated electrical connector further comprises:
    a first end attached to said battery container;
    a second terminal end opposite said first end;
    said second terminal end being located in said unenclosed volume adjacent to but spaced from said battery container;
    wherein said second terminal end extends away from said first end in a direction substantially toward said battery case bottom wall; and
    wherein said at least one elongated electrical connector is adapted to slidingly engage with said battery receptacle electrical contact member.

2. The battery of claim 1 wherein said first end is attached to said battery cover.

3. The battery of claim 1 wherein said battery is a lead-acid battery.

4. The battery of claim 1 wherein said at least one elongated electrical connector comprises a plurality of elongated electrical connectors.

5. The battery of claim 1 wherein said at least one elongated electrical connector comprises a pin.

6. The battery of claim 1 and further comprising:
    said battery container having at least one indentation therein facing said unenclosed volume; and
    wherein said at least one elongated electrical connector second terminal end is located at least partially within said at least one indentation.

7. The battery of claim 1 and further comprising:
    an opening extending through said battery container, wherein said opening is substantially surrounded by said plurality of battery cells; and
    wherein said at least one elongated electrical connector second terminal end is located within said opening.

8. A battery of the type having at least one electrical connector which is adapted to contact an electrical contact member of a battery receptacle when said battery is installed within said battery receptacle, said battery comprising:
    a battery container defining an enclosed volume and an unenclosed volume, said enclosed volume being substantially enclosed by said battery container and said unenclosed volume being located on the opposite side of said battery container relative to said enclosed volume;

said battery container comprising at least one indentation therein facing said unenclosed volume;

a plurality of battery cells located within said enclosed volume;

said at least one electrical connector electrically connected to said plurality of battery cells, said at least one electrical connector further comprising:
a first end attached to said battery container;
a second terminal end opposite said first end;
said second terminal end being located in said unenclosed volume and at least partially within said at least one indentation; and
wherein said at least one electrical connector is adapted to slidingly engage with said receptacle electrical contact member.

9. The battery of claim 8 wherein:
said battery container comprises a battery case and a battery cover;
said plurality of battery cells are located within said battery case; and
said at least one electrical contact member first end is attached to said battery cover.

10. The battery of claim 8 wherein said battery is a lead-acid battery.

11. The battery of claim 8 wherein said at least one electrical connector comprises a plurality of electrical connectors.

12. The battery of claim 8 wherein said at least one electrical connector comprises a pin.

13. The battery of claim 8 and further comprising:
an opening extending through said battery container, wherein said opening is substantially surrounded by said plurality of battery cells; and
wherein said at least one electrical connector second terminal end is located within said opening.

14. The battery of claim 9 and further comprising:
said battery case having a closed bottom wall and an oppositely disposed open end;
said battery cover closing said battery case open end; and
wherein said electrical connector second terminal end extends away from said electrical connector first terminal end in a direction substantially toward said battery case bottom wall.

15. A method of installing a battery within a battery receptacle, comprising the steps of:
providing a battery having:
a battery container defining an enclosed volume and an unenclosed volume, said enclosed volume being substantially enclosed by said battery container and said unenclosed volume being located on the opposite side of said battery container relative to said enclosed volume;

said battery container further comprising at least one indentation therein facing said unenclosed volume;

a plurality of battery cells located within said enclosed volume;

at least one electrical connector electrically connected to said plurality of battery cells, said at least one electrical connector further comprising:
a first end attached to said battery container;
a second terminal end opposite said first end;
said second terminal end being located in said unenclosed volume and at least partially within said at least one indentation; and providing a battery receptacle comprising at least one receptacle electrical contact member; and causing said at least one battery electrical connector to electrically engage with said at least one receptacle electrical contact member by moving said battery into said receptacle.

16. The method of claim 15 wherein said battery is a lead-acid battery.

17. The method of claim 15 wherein said at least one electrical connector comprises a plurality of electrical connectors.

18. The method of claim 15 wherein said at least one electrical connector comprises a pin and said at least one receptacle electrical contact member comprises a socket.

19. The method of claim 18 wherein said step of causing said at least one battery electrical connector to electrically engage with said at least one receptacle electrical contact member comprises causing said pin to enter said socket.

20. The method of claim 15 wherein said battery further comprises:
an opening extending through said battery container, wherein said opening is substantially surrounded by said plurality of battery cells; and
wherein said at least one electrical connector second terminal end is located within said opening.

21. The method of claim 15 wherein said step of moving said battery into said receptacle includes guiding said battery relative to said battery receptacle by causing contact to occur between said battery container and said at least one electrical contact member.

* * * * *

UNITED STATES PATENT AND TRADEMARK OFFICE
CERTIFICATE OF CORRECTION

PATENT NO. : 6,023,146  
DATED : Feb. 8, 2000  
INVENTOR(S) : Casale, et al

Page 1 of 2

It is certified that error appears in the above-indentified patent and that said Letters Patent is hereby corrected as shown below:

Column 1, after the title, insert --

Contractual Origin of the Invention

The Government of the United States of America has rights in this invention pursuant to sub-contract ZCB-4-13032-10 (sub-sub-contract TCB02586) awarded by the U.S. Department of Energy.

Field of the Invention

The present invention relates generally to electric batteries and, more particularly, to a system and method for conveniently and reliably connecting a battery within a battery receptacle.--

Column 1, (line 29), after "of" delete "forarni".  
Column 1, (line 30), delete "nous" and insert therefor --foraminous--.  
Column 4, (line 29), delete "bat ery" and insert therefor --battery--.  
Column 5, (line 19), delete "119" and insert therefor --114--.  
Column 5, (line 42), delete "ea" and insert therefor --a--.  
Column 6, (line 2), delete "and." and insert therefor --and--.  
Column 6, (line 23), delete "way" and insert therefor --may--.  
Column 8, (line 42), after "similar" delete ",".

UNITED STATES PATENT AND TRADEMARK OFFICE
CERTIFICATE OF CORRECTION

PATENT NO. : 6,023,146
DATED : Feb. 8, 2000
INVENTOR(S) : Casale, et al

It is certified that error appears in the above-indentified patent and that said Letters Patent is hereby corrected as shown below:

Column 9, (line 7), delete "whll" and insert therefor --will--.
Column 10, (line 23), after "as" delete ",".

Signed and Sealed this

Thirteenth Day of March, 2001

*Attest:*

NICHOLAS P. GODICI

*Attesting Officer*  *Acting Director of the United States Patent and Trademark Office*